Jan. 7, 1941.   L. F. RONAN   2,227,864
METAL CUTTING SAW
Original Filed Dec. 23, 1935   2 Sheets-Sheet 1
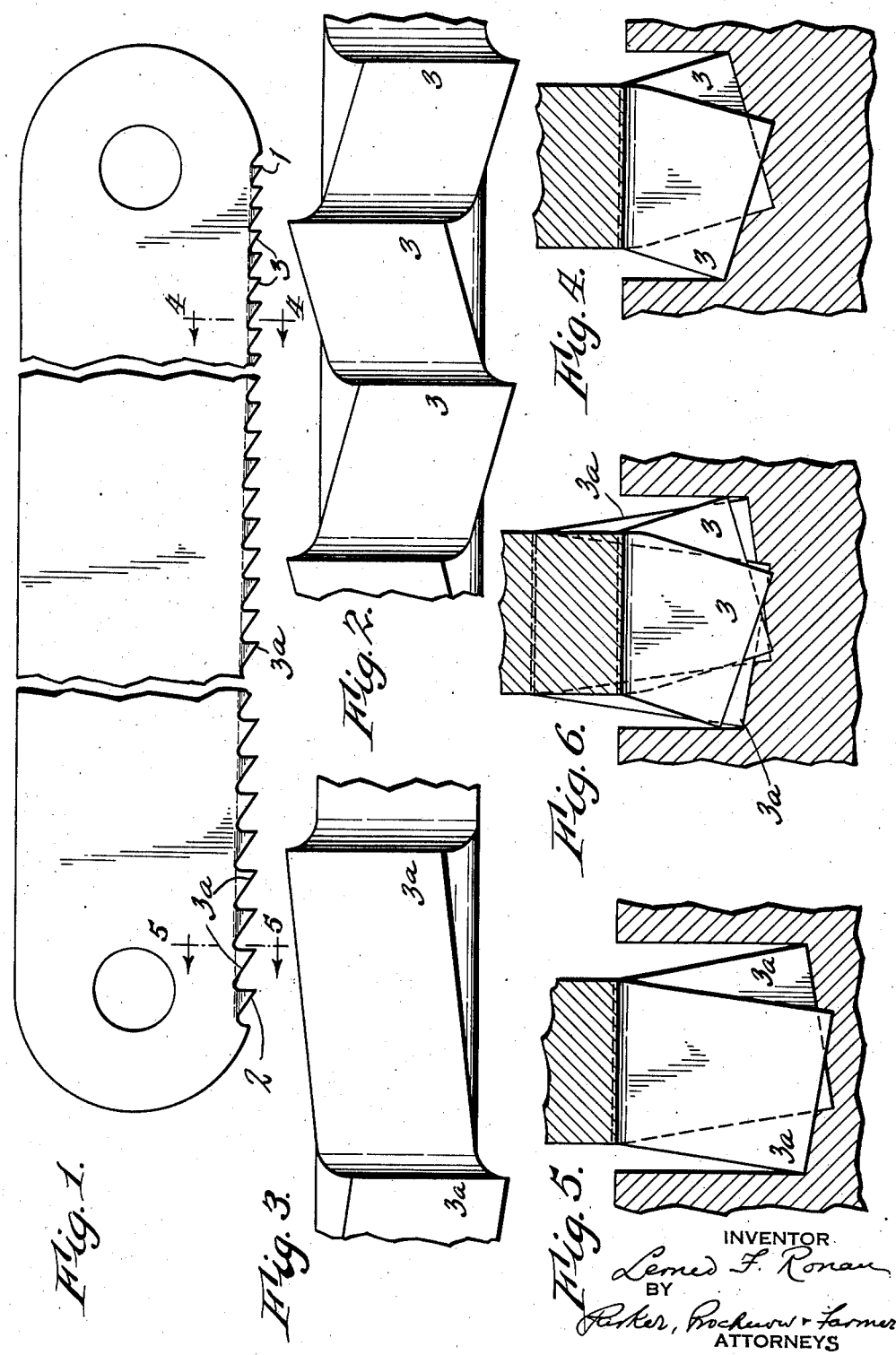
INVENTOR
Leonard F. Ronan
BY
Parker, Brockurst + Farmer
ATTORNEYS

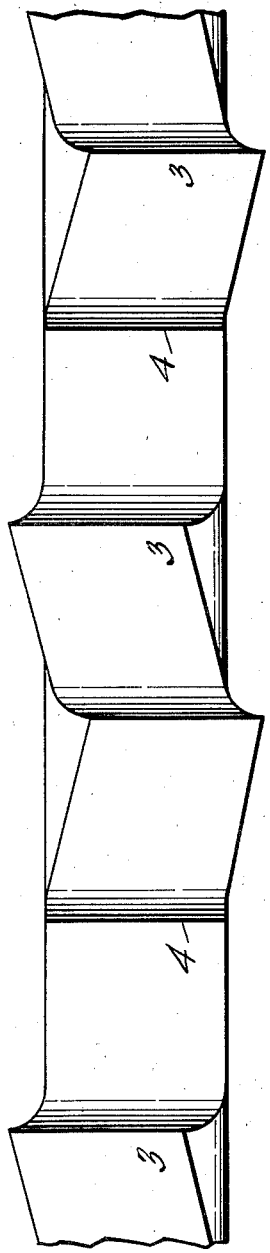
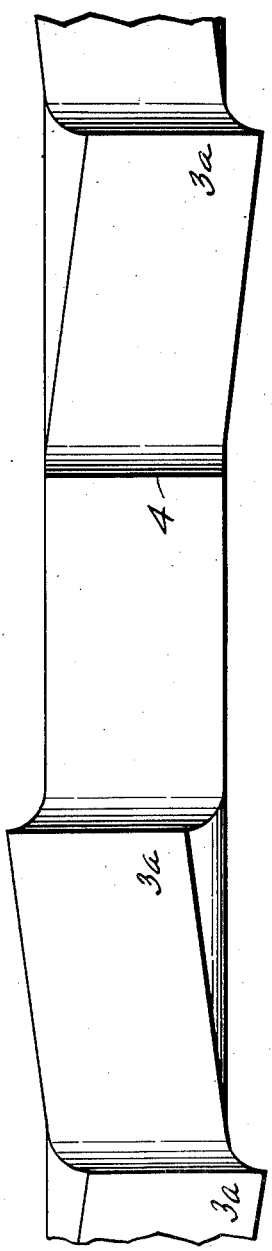
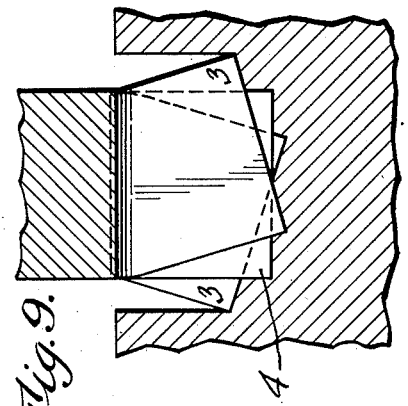
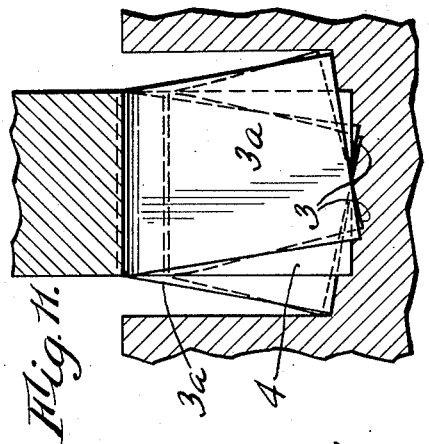
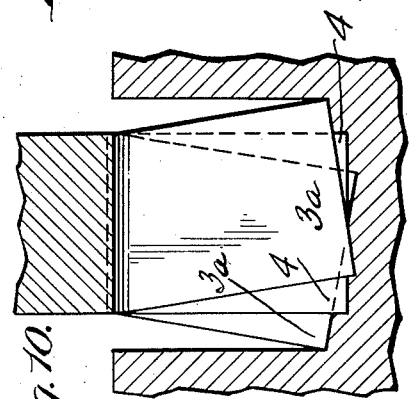

Patented Jan. 7, 1941

2,227,864

UNITED STATES PATENT OFFICE 2,227,864

METAL CUTTING SAW

Lerned F. Ronan, East Aurora, N. Y.

Continuation of application Serial No. 55,791, December 23, 1935. This application June 10, 1938, Serial No. 213,015

9 Claims. (Cl. 29—95)

This invention relates to improvements in metal-cutting or hack saws and has for its objects to provide an improved metal cutting saw of novel tooth formation which will cut faster, with less expenditure of power and with less danger of breakage of the teeth or blade than previous hack saws, and which will start the cut readily and can be successfully used to cut pieces, shapes or kinds of work on which heretofore it has been impractical to employ saws which are capable of cutting with commensurate speed.

A further object of the invention is to produce a saw having the other advantages and characteristics hereinafter pointed out.

Hack saws, as commonly made, each have teeth of a single, uniform size or pitch (the term "pitch" being used herein to mean the spacing of or distance between points of adjacent teeth), one saw having teeth most suitable for pieces of work more or less of one size, shape or character to be cut, and different saws, having teeth of different pitches or sizes, are required for different sizes, shapes or kinds of work. For instance, for cutting a piece of small diameter or having a narrow surface where the cut is started, it is common practice to use a hack saw having fine teeth of appropriate small pitch, whereas for cutting larger work pieces, saws having coarser teeth of suitable larger pitch are used in order to reduce the time required for sawing the work. It is recognized that there is less danger of breakage of the teeth or blade when a saw having fine teeth is used; and while fine teeth are desirable in order to reduce the danger of breakage and facilitate the starting of the cut, yet a saw having teeth of the maximum size which can be used with a reasonable factor of safety, is generally selected for each job in order to reduce the sawing time.

Attempts have been made to reduce the breakage of teeth and blades of hack saws and make an easier starting saw by making the saw with coarse teeth of uniform depth and pitch throughout nearly the full length of the toothed edge, but having at one end of this long series of coarse teeth, a short length or series of teeth which are fine and of equal or graduated pitch and chip clearance spaces between the teeth; or a short series of special cut-starting teeth of one or another form and arrangement at one end of the saw which are different from the remaining teeth of the saw. While such constructions may ease or facilitate the starting of a cut, they do not increase the cutting speed of the saw, and the danger of breaking the teeth or blades of such saws is not greatly lessened, owing to the abrupt change in size or form from the fine special or starting teeth at the end of the saw to the coarse teeth employed throughout the major length of the blade and which do the real cutting.

In the accompanying drawings, saws having two slightly different tooth formations embodying my invention are illustrated.

Referring to the drawings:

Fig. 1 is a side view of opposite end and intermediate sections of a saw showing the varying spacing and depth of the saw teeth.

Fig. 2 is a greatly enlarged edge view showing the short spacing at the end of the saw having the teeth of finer pitch.

Fig. 3 is a similar view showing the long spacing at the end having the teeth of coarser pitch.

Said Figs. 2 and 3 illustrate a tooth arrangement with alternate right and left setting of the teeth with no unset teeth.

Fig. 4 is a cross sectional view, greatly enlarged, on line 4—4, Fig. 1, including face views of two teeth at the end of the saw having the teeth of finer pitch.

Fig. 5 is a similar cross sectional view on line 5—5, Fig. 1, including face views of two teeth at the end of the saw having the teeth of coarser pitch.

Fig. 6 shows Figs. 4 and 5 superposed on each other representing the aggregate inclusive positions of the cutting edges of the saw teeth from end to end of the saw. This view also indicates how the cutting progressively changes from one end to the other due to the directional variation of the cutting edges caused by the variation in the setting angle of the different lengths of teeth, whereby said cutting edges change progressively to different angular relation with the work material to facilitate free cutting and free removal of material by what is known as a generating cutting action.

Figs. 7 and 8 are edge views, showing triple type-setting of the teeth which differs from that shown in Figs. 2 and 3, in that every third tooth remains unset.

Figs. 9, 10 and 11 are cross sectional views similar to Figs. 4, 5 and 6 respectively, but including the unset teeth shown in Figs. 7 and 8.

In order to overcome the difficulties and objections mentioned, saws made according to my invention are formed throughout their effective cutting length, or from end to end of their toothed edges, with teeth which gradually or progressively increase in size, both as to pitch and depth, from one end to the other of the toothed edge. That is to say, the teeth increase in pitch and depth from the smallest or finest tooth 1 at one end of the blade to the largest tooth 2 at the other end of the blade. For example, in the embodiments of the invention illustrated in the drawings, each tooth after the first tooth may be a substantially constant amount larger in size or pitch and depth than the next preceding tooth. The increase in size is gradual from one end to the other of the whole line of teeth on the saw, and the difference in size between any two adjacent teeth is very minute so that there is no marked change or jump in size from any one tooth to the next. The points of the teeth are progressively spaced farther apart, and the depth of the teeth and tooth spaces also increase progressively, thereby providing larger gullets to give increased chip clearance. By way of example, the first tooth may be a ten-point tooth, or of a size giving ten teeth to the inch, while the last tooth may be a six-point tooth or of a size giving six teeth to the inch, and the remaining teeth between the first and last teeth gradually increase in size from the ten-point tooth to the six-point tooth. These sizes are cited merely as an example, since the teeth on a saw may increase gradually from a six-point tooth to a three-point tooth, or from a tooth of any other size at one end of the saw through any practical range of larger sizes to the other end of the saw, the graduated sizes of teeth on any saw depending upon the work for which it is intended.

While the saw teeth vary in depth or length and in pitch or spacing from one end to the other of the toothed edge of the saw, with the shortest and closest teeth at one end of the toothed edge, and the longest and most widely spaced at the opposite end of the toothed edge, they are set to a constant, uniform width at the cutting edges of the teeth; thus the shorter teeth 3 are set at a greater angle than the longer ones 3a to obtain this uniform width of set. This differentiation of angle in setting of the teeth also automatically provides cutting edges of different angles in the short and the long teeth, and by this the actual cutting is broken up into constantly changing cutting planes through a cut, each edge producing chips at a different angle from another. This produces a generating cutting action which is more of a milling action and reduces the hacking action of the usual hack saw.

As the saw progresses in cutting from start to finish, it gradually takes deeper and deeper cuts with the result that there is no pulling or breaking of the teeth or the blade and a much faster cutting blade than heretofore is obtained. This allows an average coarser pitch to be used than is possible in saws of present designs. The saw not only starts easy but cuts faster with less rubbing of the teeth and with increasingly larger chips. For example, it has been shown by actual tests, that a saw with a ten-point starting tooth and ending with a six-point tooth cuts as fast as a standard six-point blade, and with a wide factor of safety, as regards the blade and tooth breakage, thus giving the user safety with increased speed of cutting. The saw can be used on smaller work than a standard blade of uniform teeth of a pitch adapted to cut as fast, or blades of the before-mentioned type having a short length of special starting teeth at one end of the blade.

The following characteristics have been observed from tests conducted with saws made as hereindescribed.

My improved saw cuts faster than previous saws and it uses less power. It lasts longer due to its smooth and free cutting which eliminates breakage of the blades as well as of the cutting edges of the teeth. There is no clogging from excessive momentary cutting or any scoring of the side surfaces of the cut from such causes.

Due to the smooth action of this saw, the cutting edges of the saw teeth are constantly at the proper angle to the work material; they are not subjected to following a wavy surface.

One reason why the improved saws herein disclosed cut faster is believed to be because of the fact that any group of the progressively spaced teeth acts independently of any other group along the blade, for the teeth of greater spacing or pitch cannot follow a wavy path corresponding to teeth of shorter spacing or pitch and vice versa. The varying spaced teeth can follow only a straight cut, and consequently no sidewise or depthwise variable motion is possible.

The unequal or varying spacing of the teeth thus provides for maintaining a straight line cut, or a cut without the so-called whipping or weaving action often encountered in the use of ordinary saws having teeth which are evenly spaced or of uniform pitch. The uneven spacing also indirectly becomes a power saver for it does not permit the teeth to run off from their course to again be dragged back, as when a wavy cut is made.

Straight line cuts produce smooth surfaces, resulting in saving of work and of material. The bottom of the cut as well as the sides remaining straight, insures a predetermined correct cutting angle relative to the direction of movement; this operates to maintain sharp cutting edges during a much longer period than when working in a wavy cut when the cutting edges ride up and down over ridges and valleys.

The type of triple setting shown in Figs. 7 to 10, which combines the feature of teeth of varying pitch and depth shown in Figs. 1–6 with unset teeth 4 alternating with teeth set to opposite sides of the blade, has proved exceptionally efficient.

In the described saw, as in the case of ordinary hack saws, the teeth are cut in the metal and set previous to heat-treatment, and the saw is then hardened and tempered only to that degree of hardness that is file-hard, or a hardness equivalent to approximately C–60 to C–65 Rockwell hardness.

While the description and drawings show my preferred form and arrangement of saw teeth, it is obvious that my invention is not limited to these specific structural details, nor to the specific progressive increase of pitch and depth of the teeth disclosed, in which the progress is by successive increments between successive single tooth units as distinguished from successive teeth units of one or more than one tooth each.

This application is a continuation of my application, Serial No. 55,791, filed Dec. 23, 1935.

I claim as my invention:

1. A saw blade having a toothed edge comprising teeth which vary gradually in pitch and depth along the toothed edge throughout the major portion of its length, said teeth being set angularly and alternately sidewise, the smaller teeth being set at angles greater than the larger teeth such that a uniform thickness of the aggregate cutting edges of all of the teeth is obtained regardless of the size of the teeth and the kerf cut by the saw is of uniform width throughout its length.

2. A saw blade according to claim 1, provided with teeth of varying pitch, said teeth having cutting edges positioned at varying angularity to the plane of the blade, the angles of the smaller teeth being greater than the angles of the larger teeth to conform with the setting angle affecting the width of the aggregate cutting edges of all of the teeth.

3. A saw blade having a toothed edge comprising teeth which gradually increase progressively in pitch and depth from one end to the other of the toothed edge, certain of said teeth being set angularly to one side and others to the opposite side of the blade, and the width of set of the cutting edges of all of the set teeth being uniform through the length of the toothed edge, whereby the kerf cut by the saw is of uniform width throughout its length.

4. A saw blade according to claim 3, in which the progressive increase in pitch and depth of the teeth is by constant increments throughout the toothed edge.

5. A saw blade according to claim 4, in which the variation in pitch and depth of the teeth progresses by constant increments between successive teeth.

6. A hack saw comprising a blade having cutting teeth extending along an edge thereof substantially throughout the effective cutting length of the blade, said toothed edge comprising a continuous series of teeth which differ progressively and gradually both in the number of teeth per inch and in depth from the smallest tooth at that end of the series adjacent the starting end of the saw to the largest tooth at the other end of the series, and said teeth being substantially file-hard and of uniform width of set throughout the series.

7. A saw blade having a toothed edge comprising teeth which increase gradually in pitch and depth from one end to the other of the toothed edge, certain of said teeth being set angularly to one side of the blade and other teeth being set angularly to the other side of the blade, and the smaller teeth being set to greater angles than the larger teeth, said difference in angular setting of the teeth being such that a uniform thickness of the aggregate cutting edges of the whole series of the teeth is obtained.

8. A saw blade according to claim 7 in which certain of said teeth are set angularly to one side, certain other teeth are set angularly to the other side, and certain other teeth are left unset.

9. A metal cutting saw blade having a toothed profile edge, the teeth along the major portion of the length of said edge being of varying depth and spacing and having body portions of progressively varying size, the intersections of the profile edges of each tooth constituting a cutting edge at right angles to the sides of the tooth body, and the teeth being set alternately sidewise at progressively varying angles in accordance with size of the teeth such that the larger teeth are set at lesser angles than the smaller teeth to form a cutting edge of uniform width along the blade and the individual cutting edges of said teeth lying in non-parallel planes.

LERNED F. RONAN.